United States Patent
Hubbard

[19]

[11] Patent Number: 5,839,710
[45] Date of Patent: Nov. 24, 1998

[54] CONCEALABLE VARIABLE SIZE VEHICLE CONTAINER HOLDER WITH FLEXIBLE BAND

[75] Inventor: Gary Lee Hubbard, Sterling Heights, Mich.

[73] Assignee: Ford Global Technologies, Inc., Dearborn, Mich.

[21] Appl. No.: 851,395

[22] Filed: May 5, 1997

[51] Int. Cl.$^6$ ....................................................... A47K 1/08
[52] U.S. Cl. ......................................... 248/311.2; 224/926
[58] Field of Search ............................. 248/311.2, 309.1, 248/313, 316.1; 224/926

[56] References Cited

U.S. PATENT DOCUMENTS

| | | | |
|---|---|---|---|
| 2,916,838 | 12/1959 | Campbell | 224/926 |
| 4,613,048 | 9/1986 | McGill . | |
| 4,783,037 | 11/1988 | Flowerday . | |
| 4,877,284 | 10/1989 | Doane | 224/926 |
| 5,139,222 | 8/1992 | Koorey et al. . | |
| 5,167,392 | 12/1992 | Henricksen . | |
| 5,219,140 | 6/1993 | Spykerman . | |
| 5,297,709 | 3/1994 | Dykstra et al. | 248/311.2 |
| 5,318,266 | 6/1994 | Liu . | |
| 5,673,891 | 10/1997 | Fujihara et al. | 248/311.2 |

FOREIGN PATENT DOCUMENTS

| | | |
|---|---|---|
| 38 31 317 C1 | 3/1990 | Germany . |
| 41 35 316 A1 | 4/1993 | Germany . |
| 5-213106 | 8/1993 | Japan . |
| 6-72224 | 3/1994 | Japan . |

*Primary Examiner*—Ramon O. Ramirez
*Assistant Examiner*—Robert Lipcsik
*Attorney, Agent, or Firm*—David B. Kelley

[57] ABSTRACT

A variable size container holder for an automotive vehicle has a tray movable between a retracted position retracted into a cavity in a vehicle trim piece and an extended position extending from the trim piece. Along an edge of the tray is at least one container receiving portion and at least one channel. Bounding the container receiving portion and mounted in the channel is a flexible band having a first end fixed relative to the tray and a second end movable within the channel. The flexible band is thus adjustable, when the tray is in the extended position, between a taut position substantially flush with the edge of the tray and a container holder position in which a middle section of the retaining member is drawn laterally away from the container receiver portion to allow a container to rest in the container receiving portion. The flexible retaining member grips a vertically extending surface of a container so as to secure it into the container receiving portion.

17 Claims, 4 Drawing Sheets

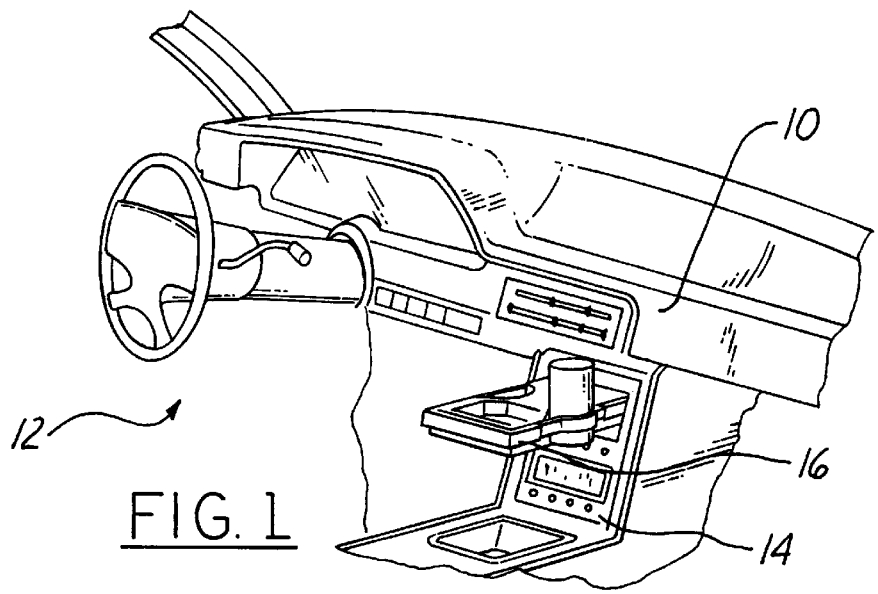
FIG. 1
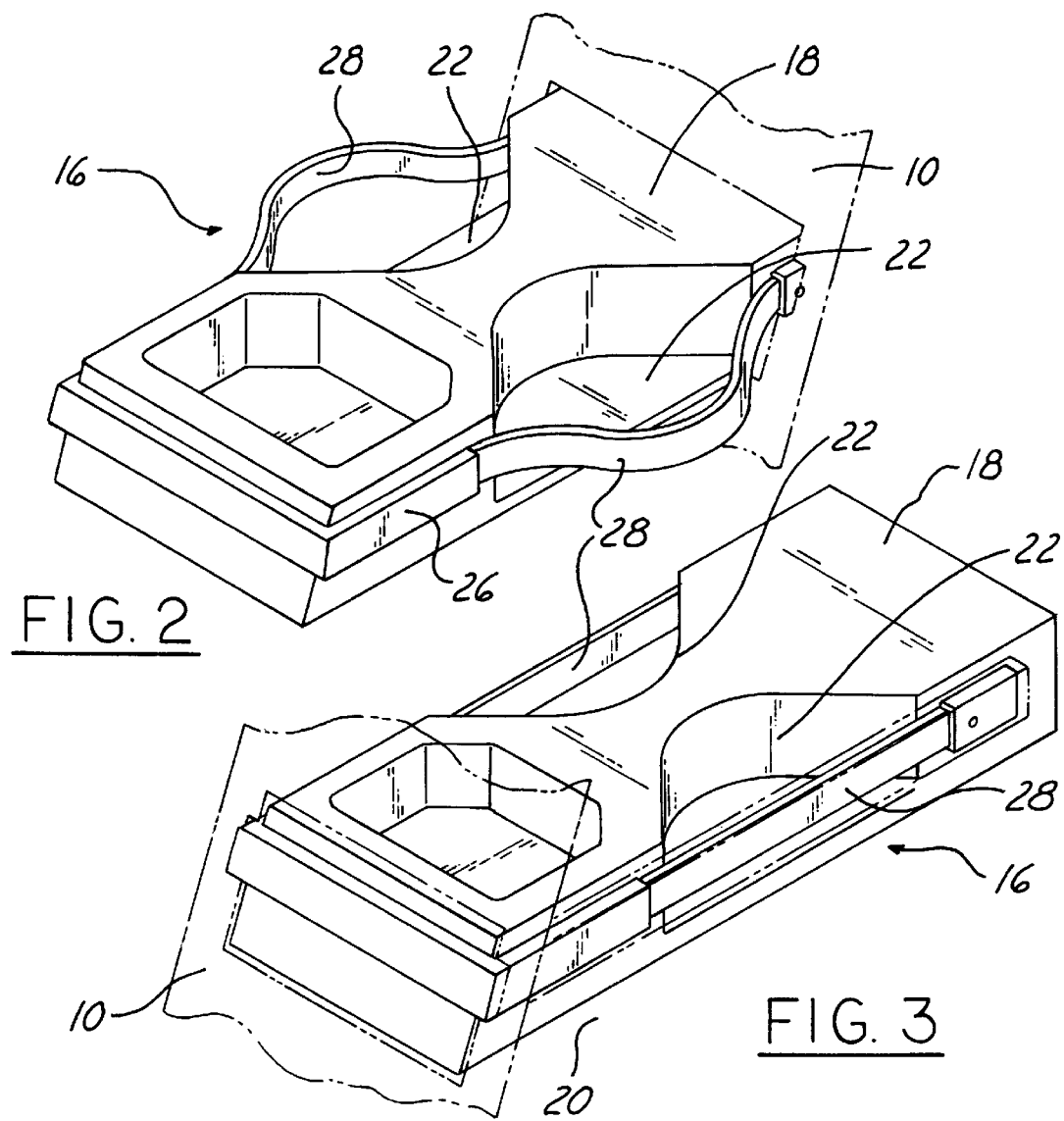
FIG. 2
FIG. 3

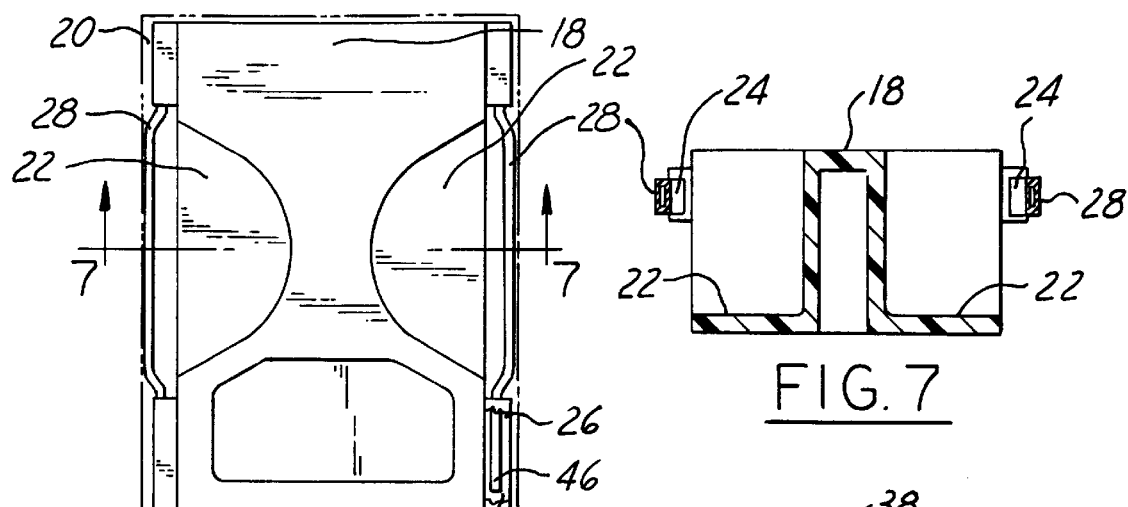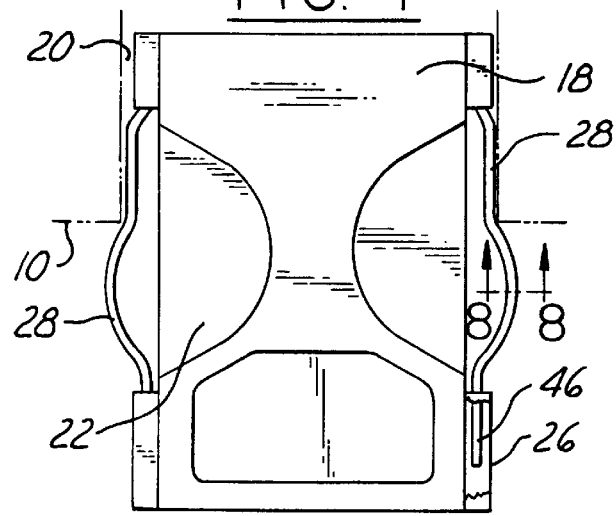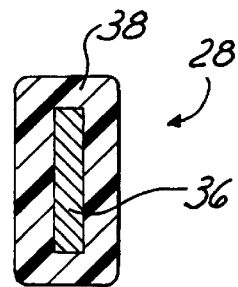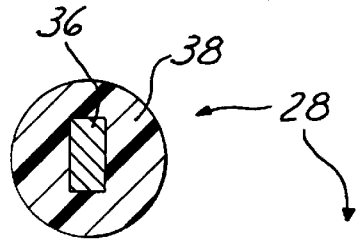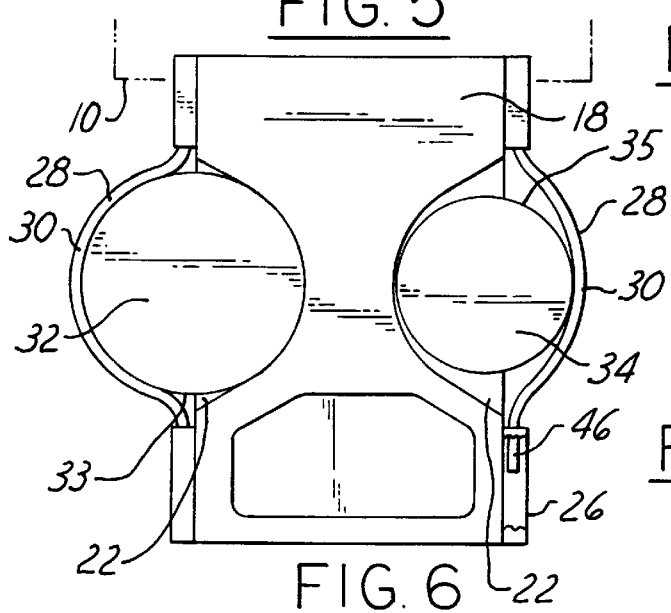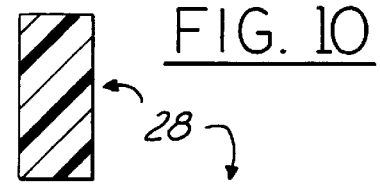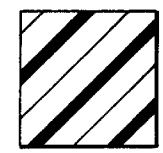

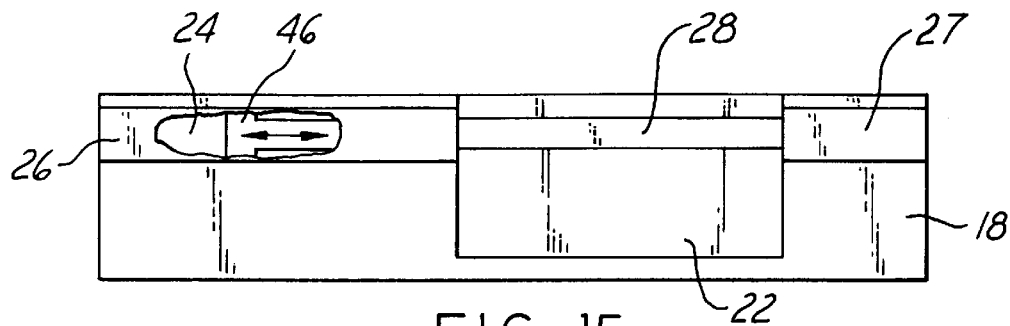
FIG. 15
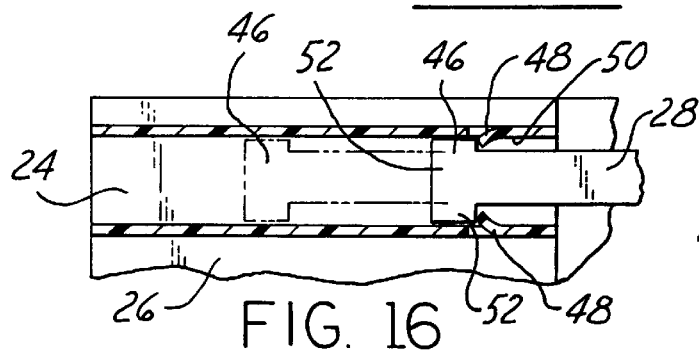
FIG. 16
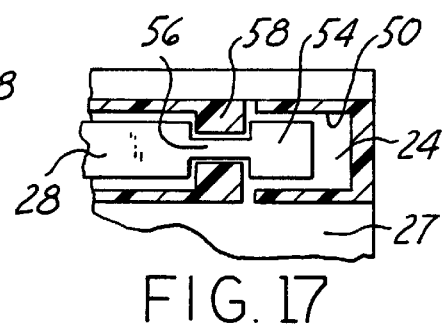
FIG. 17
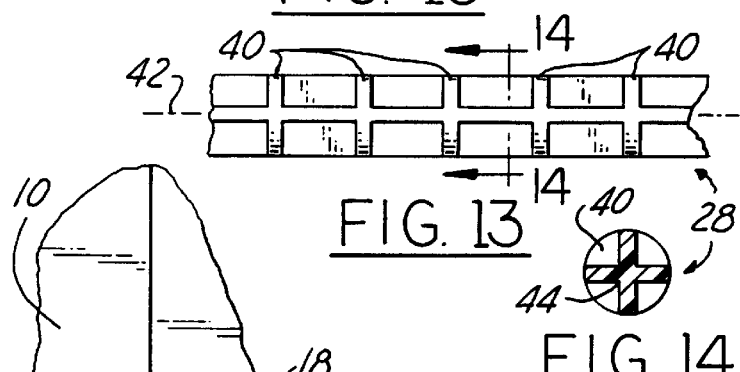
FIG. 13
FIG. 14
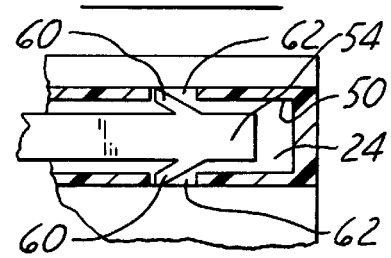
FIG. 18
FIG. 19
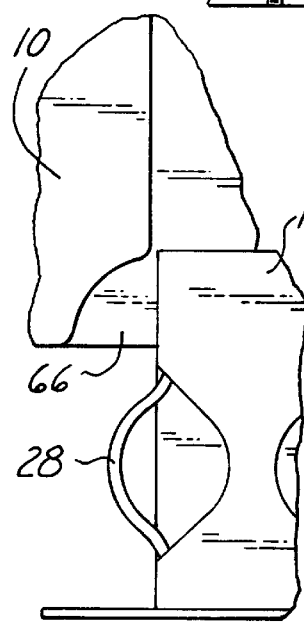
FIG. 20
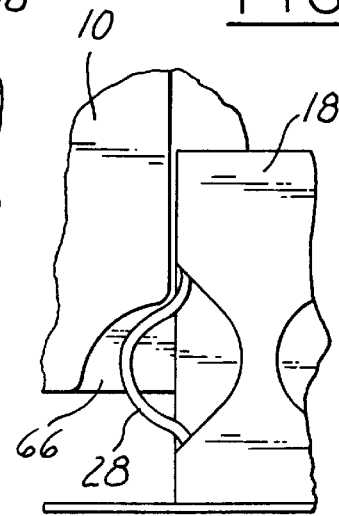
FIG. 21
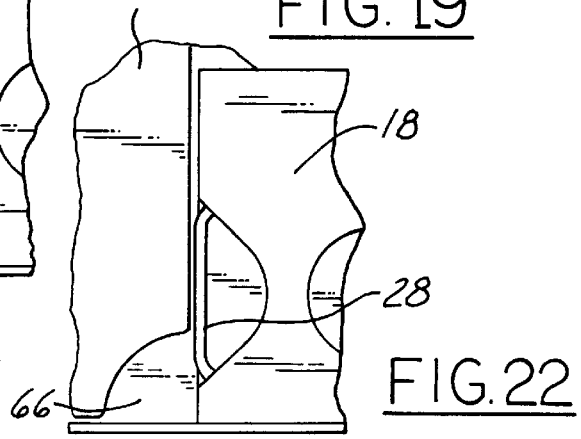
FIG. 22

CONCEALABLE VARIABLE SIZE VEHICLE CONTAINER HOLDER WITH FLEXIBLE BAND

FIELD OF THE INVENTION

The present invention relates to vehicle container holders in general, and more specifically to a variable size concealable container holder.

BACKGROUND OF THE INVENTION

A popular feature for automotive vehicle passenger compartments is a device which holds a container, such as a beverage can or cup, to provide convenient storage while motoring. Many designs for such devices, commonly referred to as container holders or cup holders, have evolved to meet perceived occupant desires. Initially, ring shaped devices and depressions in a internal vehicle surface served to receive containers. Two potential drawbacks of such container holders became apparent: first, the container holders were fixed in size thus limiting the container size which it could receive; and, second, the container holders are sometimes considered unsightly when not in use thus lessening passenger compartment aesthetics.

In an effort to remedy the latter problem, retractable container holders have been developed which permit storage of the container holder in a trim piece concealed from view within the passenger compartment, such as disclosed in U.S. Pat. No. 5,141,194 (Burgess et al.) and U.S. Pat. No. 4,453,759 (Kathira).

Different approaches have been used to provide a container holder for receiving varying size containers. It is known to provide a resilient sleeve within a generally rigid container holder to provide support for containers of smaller diameter than the rigid diameter container holder (U.S. Pat. No. 4,613,048). In addition, it is known to provide flexible tabs on an interior surface of a container holder to support a smaller diameter container therein. These sleeves and tabs, usually made of a polypropylene material, can sag and wear with use, thus limiting their effectiveness.

Another approach to the varying sized container holder is to use adjustable, semi-round arms which are spring loaded to grip the sides of a container (U.S. Pat. No. 5,167,392 and U.S. Pat. No. 5,318,266). Such arms are inflexible, require many parts, are difficult to assemble, and expensive to manufacture.

Another device expands the size of the container holder to fit the container by having overlapping sidewalls with a locking mechanism for adjustable locking the sidewall into a selected diameter (U.S. Pat. No. 5,219,140). Such a device adds complexity by requiring a locking mechanism, lacks durability, and is expensive to manufacture.

Other approaches, such as seen in U.S. Pat. No. 5,139, 222, use rings of varying sizes to support varying sized containers. Such an approach, however, adds expense to the device and is limited by the size of the rings used.

SUMMARY OF THE INVENTION

The present invention overcome the deficiencies of the prior art by providing a variable size, container holder which is concealable within a cavity in an automotive vehicle. The container holder preferably has a tray which is moveable between a retracted position in the cavity and an extended position extending into the passenger compartment from the cavity. The tray has at least one container receiving portion adjacent an edge of the tray, the container receiving portion bounded along the edge of the tray by retainer means mounted for movement, when the tray is in the extended position, between a taut position substantially flesh with the edge of the tray and a container holder position drawn laterally away from the container receiving portion. The retainer means grips a vertically extending surface of a container when in the container receiving portion so as to bias the container in place within the container receiving portion.

Preferably, the retainer means comprises a flexible band having a first end fixed relative to the tray and a second end movable within a channel in the tray to allow the band to be adjusted laterally with respect to the tray so that containers of varying sizes can be secured within the container receiving portion. When a container is removed from the container receiving portion, the flexible band is returned to the taut position by movement of the tray from the extended position to the retracted position. During this movement, the flexible band contacts a surface of the trim piece which forces it into the channel thus returning it to the taut position.

An advantage of the present invention is a vehicle container holder capable of securely retaining containers of varying sizes.

Another advantage is a varying size retaining container holder which is durable and which has a minimum number of parts.

Yet another advantage of the present invention is a container holder which is inexpensive to manufacture and easy to assembly.

A feature of the present invention is a container holder having at least one container receiving portion bounded by a flexible retaining band which can be adjusted relative to the container receiving portion of the container holder to securely hold a container therein.

BRIEF DESCRIPTION OF THE DRAWINGS

These and other objects, advantages, and features of the present invention will be apparent to those skilled in the art upon reading the following description with reference to the accompanying drawings, in which:

FIG. 1 is a perspective view of a vehicle interior in the direction of an instrument panel therein showing a cup holder according to the present invention in an extended, cup holding position;

FIG. 2 is a perspective view of the cup holder shown in FIG. 1;

FIG. 3 is a perspective view of the cup holder of FIG. 2 shown in a retracted position within a cavity of a trim piece in the vehicle;

FIG. 4 is a top view of the cup holder of FIG. 3;

FIG. 5 is a top plan view of the cup holder of the present invention showing the tray in a partially extended position;

FIG. 6 is top plan view of a preferred embodiment of the present invention showing a cup holder having a tray in an extended position with containers of different sizes retained thereto by a flexible band member;

FIG. 7 is a cross-sectional view taken along lines 7—7 of FIG. 4;

FIG. 8 is a cross-sectional view taken along line 8—8 of FIG. 5;

FIGS. 9 through 12 are cross-sectional views of alternative flexible band members of the present invention;

FIGS. 13 through 14 are a side view and a cross-sectional view, respectively, of an alternative flexible band member of the present invention;

FIG. 15 is a partially cut-away side view of a container holder of the present invention showing a flexible band member with a free end movable within a tray channel;

FIG. 16 is a cross-sectional view of a tray channel along an outer edge of the tray for receiving the flexible band members showing movement of a free end of the band member within the channel and a stop for preventing the free end from moving out of the channel;

FIG. 17 is a cross-sectional view of a band channel similar to that shown in FIG. 9, but showing a fixed end of the band fixed within the channel;

FIG. 18 is a cross-sectional view similar to FIG. 17 but showing a first alternative configuration for fixing the fixed end within the channel;

FIG. 19 is a cross-sectional view similar to FIG. 17 but showing a second alternative configuration for fixing the fixed end within the channel;

FIG. 20 is a partial top plan view of an alternative embodiment of container holder of the present invention having a cut-out to facilitate movement of the flexible band member to the taut position when the tray is returned to a retracted position;

FIG. 21 is a partial top plan view of the container holder of FIG. 20 showing the tray in a partially extended position;

FIG. 22 is a partial top plan view of the container holder of FIG. 20 showing the tray in a fully extended position;

DETAILED DESCRIPTION OF THE PREFERRED EMBODIMENT

Figure 23:
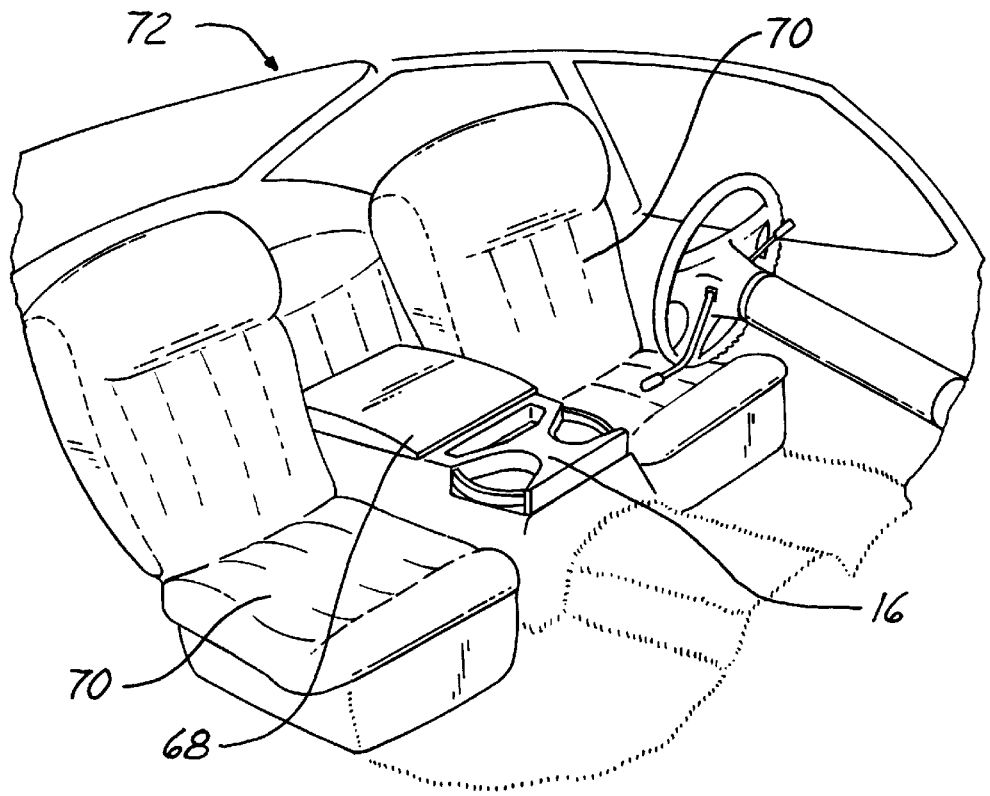
FIG. 23 is a perspective view of a vehicle passenger compartment showing a center console having a container holder of the present invention deployable therefrom.

Turning now to the drawings, and in particular to FIG. 1 thereof, a vehicle instrument panel 10 within a vehicle passenger compartment, generally indicated at 12, has a console 14 with a variable size, concealable container holder 16 according to the present invention mounted thereto. The container holder 16 has a tray 18 moveable between an extended position (FIGS. 1 and 2) and a retracted position (FIG. 3) retracted into a cavity 20 in the instrument panel 10. In a preferred embodiment, the tray 18 has a pair of container receiving portions 22 on opposite lateral sides of the tray. Bounding the container receiving portions 22 and mounted in a channel 24 (FIG. 4) on an outer edge 26 of the tray 18, are flexible bands 28. The flexible bands 28 are movable between a taut position substantially flush with the edge of the tray (FIGS. 3 and 4) and a container holder position in which a middle section 30 of the flexible bands 28 is drawn laterally away from the container receiver portions 22 to allow containers 32, 34 to fit thereinto (FIGS. 5 and 6). Since the flexible bands 28 can be moved relative to the tray 18, varying sized containers can be placed within the container holder of the present invention, as illustrated in FIG. 6.

The flexible bands 28 preferably comprise a substantially flat metal band 36 having a rubber coating 38 therearound (FIGS. 7–9). Alternatively, the flexible bands 28 may be made of a polymer material, or another material which provides the bands 28 with flexibility and durability. The cross-sections of the bands 28 may take various shapes, as seen in FIGS. 8–12. Preferably, the cross-section of the band 28 is rectangulary shaped (FIGS. 8 and 11) such that the longer side of the rectangulary shaped cross-section runs in a generally vertical direction with respect to the tray 18 so as to contact, and grip, a vertically extending surface of a container so as to bias the container in place within the container receiving portion 22. Other cross-sectional shapes, in addition to circular (FIG. 9), diamond (FIG. 10), and square (FIG. 12), may also be used. Another possible cross-sectional shape for the bands 28 is a cross with spaced rings 40 spaced along an axis 42 through the center 44 of the band 28 (FIGS. 13 and 14).

Referring now to FIGS. 15 and 16, each band 28 preferably has a free end 46 movable within the channel 24 which allows the band 28 to move between the taut position and the container holder position. Movement of the free end 46 between the taut position and the container holder position is best seen in FIGS. 4–6. The free end 46 is held within the channel 24 by a pair of tabs 48 extending from an inner surface 50 of the channel 24 to interact with extensions 52 on the free end 46 (FIG. 16). Alternately, the extensions 52 may be used without the tabs 48 to prevent the band 28 from exiting the channel 24 provided the band slides through an opening smaller than the cross-sectional size of the free end 46.

Each band 28 also has a fixed end 54 which can be fixed within the channel 24 in various ways, including those shown in FIGS. 17–19. In FIG. 17, the band 28 has a narrowed section 56 of reduced cross-section and a restrictor 58 extending from the surface 50 of the channel 24 box restricts movement of the fixed end 54 within the channel 24. Alternatively, the free end 54 may have a pair of fingers 60 extending therefrom for interaction with a pair of opening 62 in the channel inner surface 50 to prevent the fixed end 54 from moving. (FIG. 18). The fixed end 54 may also be pinned within the channel 24 with a pin 64 (FIG. 19) or another means for attaching the free end 54 known to those skilled in the art and suggested by this disclosure.

Figure 24:
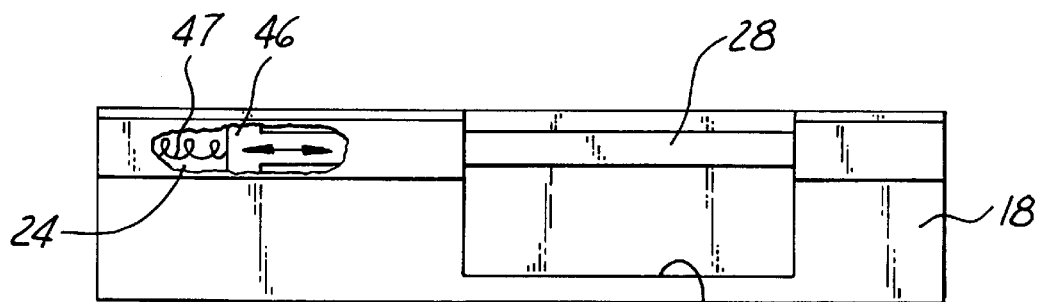
FIG. 24 is a partially cut-away side view of a container holder of the present invention showing a flexible band member with a spring attached to the free end for providing tension.
Figure 25:
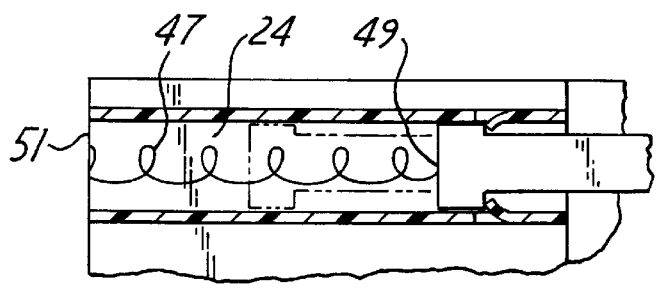
FIG. 25 is a cross-sectional view of the tray channel of FIG. 24 showing the spring attachment in greater detail.

In a preferred embodiment of the present invention, the free end 46 is friction fit within the channel 24 to provide the necessary tension in order to keep a container within the container receiving portions 22. Those skilled in the art will recognize that the flexible band 28 may be held tight against a container when in the container receiving portion 22 by a tension member, such as a spring 47 (FIGS. 24 and 25), mounted to the free end 46 on one end and to a back end 49 (FIG. 25) of the channel 24 on the other end 51 so as to bias the free end 46 in a direction away from the container receiving portion 22. The tension on the band 28 is thus directed generally perpendicular to the retention force needed to retain the container within the container receiving portion, thus advantageously distinguishing over other approaches such as spring-loaded arms and the like.

It should also be recognized that the free end 46 is on an opposite side of the container receiving portion 22 from the fixed end 54, the free end 46 moving within the channel 24 along the edge 26 of the tray 18 (FIGS. 15 and 16), and the fixed end 54 remains stationary within the channel 24 along edge 27 of the tray 18 (FIGS. 15 and 17).

In operation, with reference to FIGS. 4–6, the container holder of the present invention is concealed within a cavity 20 in the instrument panel 10 with the tray 18 in the retracted position and the flexible bands 28 in the taut position (FIG. 4). When use of the container is desired, the tray 18 is pulled from within the cavity 20 (FIG. 5) revealing the container receiving portions 22 and the flexible bands 28 can be laterally away from the tray 18 in order to allow containers, such as those depicted in FIG. 6, to be placed into the container receiving portions 22. The flexible bands 28 grip vertically extending surfaces 33, 35 to hold the containers 32, 34 in the tray 18. As previously discussed, the bands 28 preferably are biased so as to tightly hold the containers 32, 34 within the container receiver portions 22.

When the containers 32, 34 have been removed from the container holder, and it is desired to once again conceal the container holder, the tray is moved from the extended position (FIG. 6) to the retracted position (FIG. 4), during which time the flexible bands 28 are returned to the taut position under both the tension force of the spring attached to the free end of the band 28, and the movement of the band 28 against the instrument panel 10, or against another trim piece into which the container holder is mounted. Movement of the flexible bands 28 from the container holder position to the taut position may be facilitated by having a wedge, or cut-out portion 66, which serves to gradually redirect the flexible band 28 into the channel 24 so as to ease the movement therein.

Movement of the tray between the retracted position (FIGS. 4 and 22) and the extended position (FIGS. 6 and 20) can be accomplished using a push mechanism, such as that described in U.S. Pat. No. 4,453,759, assigned to the assignee of the present invention and incorporated herein by reference. Other means and mechanisms may also be used for movement between the retracted and extended positions of the tray 18 as is known in the art.

Those skilled in the art will recognize that the container holder 16 of the present invention is not limited to placement within an instrument panel as depicted in FIG. 1, but can be used in any desired location within an automobile passenger compartment, or in any desirable location within the vehicle. As an example, use of a container holder 16 in a center console 68 between front seats 70 within the passenger compartment 72. Those skilled in the art will also recognize that the number and location of container receiving portions 22 in the tray 18 is not limited to those depicted in the drawings, but can include many variations thereof. Such variations may include a single container receiving portion, or more than two container receiving portions. In addition, the container receiving portions may be located on a front edge of a tray 18 as opposed to a side edge. Regardless of where the container receiving portion is located on the tray 18, it will be bounded by a flexible retaining band 28 as herein described in order to provide secure retention of variable sized containers within the tray 18.

Although the preferred embodiment of the present invention has been disclosed, various changes and modifications may be made without departing from the scope of the invention as set forth in the appended claims.

I claim:

1. A variable size container holder concealable within a cavity in an automotive vehicle, comprising:
    a tray movable between a retracted position retracted into the cavity and an extended position extending from the cavity;
    at least one container receiving portion adjacent an edge of the tray; and
    a flexible band mounted for movement, when the tray is in the extended position, between a taut position substantially flush with the edge of the tray and a container holder position drawn laterally away from the container receiving portion, the band comprising a substantially flat metal band having a rubber coating therearound for gripping a vertically extending surface of a container so as to bias the container in place within the container receiving portion.

2. A container holder according to claim 1 wherein the tray has a pair of semi-cylindrically shaped container receiving portions on opposite sides.

3. A container holder according to claim 1 wherein movement of the tray from the extended position to the retracted position causes the flexible retainer means to move from the container holder position to the taut position by contact of the retainer means against a portion of the trim piece in the automotive vehicle.

4. A variable size container holder concealable within a trim piece of an automotive vehicle, comprising:
    a tray movable between a retracted position retracted into a cavity in the trim piece and an extended position extending from the vehicle trim piece;
    at least one container receiving portion along an edge of the tray;
    at least one flexible retaining member mounted for movement, when the tray is in the extended position, between a taut position substantially flush with the edge of the tray and a container holder position drawn laterally away from the container receiver portion, in gripping relationship with a vertically extending surface of a container so as to bias the container in place within the container receiving portion; and
    wherein movement of the tray from the extended position to the retracted position causes the at least one flexible retaining member to move from the container holder position to the taut position by contact of the retaining member against a portion of the trim niece in the automotive vehicle.

5. A container holder according to claim 4 wherein the tray has a pair of semi-cylindrically shaped container receiving portions each having a flexible retaining member for retaining containers of varying sizes.

6. A container holder according to claim 4 wherein at least one flexible retaining member comprises a flexible band.

7. A container holder according to claim 6 wherein the flexible band comprises a substantially flat metal band having a rubber coating therearound.

8. A container holder according to claim 6 wherein the flexible band is made of a polymer material.

9. A container holder according to claim 8 wherein the flexible band has a rectangular cross-section.

10. A container holder according to claim 8 wherein the flexible band has a square cross-section.

11. A container holder according to claim 8 wherein the flexible band has a cross-shaped cross-section with a plurality of spaced rings therearound.

12. A variable size container holder concealable within a trim piece of an automotive vehicle, comprising:
    a tray movable between a retracted position retracted into a cavity in the vehicle trim piece and an extended position extending from the trim piece;
    at least one container receiving portion along an edge of the tray;
    at least one channel formed in the edge of the tray;
    at least one flexible retaining member having a first end fixed relative to the tray and a second end movable within the channel so as to allow at least one flexible retaining member to move, when the tray is in the extended position, between a taut position substantially flush with the edge and a container holder position in which a middle section of the retaining member is drawn laterally away from at least one container receiving portion, in gripping relationship with a vertically extending surface of a container so as to bias the container into the container receiving portion; and stop means for holding the second end of the flexible retaining member within the channel.

13. A container holder according to claim 12 wherein the stop means comprises a pair of stop tabs extending from the tray into the channel for interaction with a pair of extensions on the second end when the second end reaches a predetermined location in the channel.

14. A container holder according to claim 12 wherein the first end has a pair of stop extensions for interaction with a pair of check tabs extending from the tray into the channel to prevent the first end from moving in the channel.

15. A container holder according to claim 12 wherein the first end has a pair of fingers extending therefrom for interaction with a pair of openings in the tray to prevent the first end from moving in the channel.

16. A container holder according to claim 15 wherein the at least one flexible member has tension means operative therewith for maintaining a tension force thereon to bias the at least one flexible member to the taut position.

17. A container holder according to claim 15 wherein the tray has a pair of semi-cylindrically shaped container receiving portions.

* * * * *